US010286921B2

(12) United States Patent
Jo

(10) Patent No.: US 10,286,921 B2
(45) Date of Patent: May 14, 2019

(54) DROWSINESS PREVENTION SYSTEM FOR VEHICLE

(71) Applicant: LUMENS CO., LTD., Yongin-si, Gyeonggi-do (KR)

(72) Inventor: Sungsik Jo, Yongin-si (KR)

(73) Assignee: LUMENS CO., LTD., Yongin-si (KR)

( * ) Notice: Subject to any disclaimer, the term of this patent is extended or adjusted under 35 U.S.C. 154(b) by 0 days.

(21) Appl. No.: 16/136,825

(22) Filed: Sep. 20, 2018

(65) Prior Publication Data
US 2019/0100219 A1    Apr. 4, 2019

(30) Foreign Application Priority Data

Sep. 29, 2017  (KR) .......................... 10-2017-0127307

(51) Int. Cl.
*G06K 9/00* (2006.01)
*B60W 50/14* (2012.01)
*B60W 40/08* (2012.01)

(52) U.S. Cl.
CPC ............ *B60W 50/14* (2013.01); *B60W 40/08* (2013.01); *G06K 9/00597* (2013.01); *G06K 9/00845* (2013.01); *B60W 2040/0827* (2013.01); *B60W 2050/143* (2013.01)

(58) Field of Classification Search
CPC .................. B60W 50/14; B60W 40/08; B60W 2040/0827; B60W 2050/143; G06K 9/00597; G06K 9/00845
See application file for complete search history.

(56) References Cited

U.S. PATENT DOCUMENTS

| 3,947,815 A * | 3/1976 | Muncheryan | B60Q 1/503 340/575 |
| 2005/0163383 A1* | 7/2005 | Kim | G06K 9/00597 382/209 |
| 2006/0215244 A1* | 9/2006 | Yosha | G02B 27/0101 359/15 |
| 2014/0204193 A1* | 7/2014 | Zhang | G06K 9/00597 348/78 |
| 2016/0042240 A1* | 2/2016 | Takeda | G06K 9/00597 382/104 |
| 2017/0345276 A1* | 11/2017 | Stoltz | G08B 21/06 |
| 2018/0260640 A1* | 9/2018 | Lintz | G06K 9/00248 |

\* cited by examiner

*Primary Examiner* — Munear T Akki
(74) *Attorney, Agent, or Firm* — Mei & Mark LLP

(57) ABSTRACT

Disclosed is a drowsiness prevention system installed in a vehicle. The drowsiness prevention system includes: a light emitting unit irradiating infrared light toward the driver's iris, an infrared camera capturing images of the driver's iris, and a warning sound generating unit determining the driver to be drowsy to generate a warning sound when the driver's iris is not detected from the images captured by the infrared camera within a preset reference time. The distribution angle pattern of the infrared light is inclined from a central axial line. The light emitting unit is mounted in an area other than the driver's front area.

10 Claims, 9 Drawing Sheets

DROWSINESS PREVENTION SYSTEM FOR VEHICLE

BACKGROUND OF THE INVENTION

1. Field of the Invention

The present invention relates to a drowsiness prevention system for a vehicle, and more specifically to a drowsiness prevention system for a vehicle that can be installed at various locations in the vehicle and can recognize and analyze the driver's iris to prevent the driver from driving while drowsy.

2. Description of the Related Art

A conventional drowsiness prevention system for a vehicle is operated in such a manner that a warning sound is generated when the driver is determined to be drowsy or fatigued based on information about images of the driver's full face, particularly images of sites around the driver's eyes. The driver's condition is observed using an infrared camera and the images about the driver are input to the drowsiness prevention system. The determination about the driver's drowsiness or fatigue is made based on the openness of the driver's eyes, the frequency of eye blinking or the frequency of yawning in a given time.

However, the analysis of the information about the images of the driver's full face captured by the infrared camera may lead to frequent misjudgements depending on the driver's posture, habits or unique behavior while driving, impeding safe driving.

To solve such problems, it is necessary to clearly capture images of the driver's eyes using an infrared camera such that the driver's condition is more accurately determined. To this end, infrared light necessary for imaging needs to be focused on the driver's eyes. For more accurate focusing of infrared light on the driver's eyes, an infrared light emitting unit should be located such that infrared light is directed from the driver's front side toward the driver's eyes.

However, many limitations are encountered in mounting the infrared light emitting unit because there are no structures other than the windscreen in front of the driver. Moreover, the infrared light source mounted in front of the driver to accurately focus infrared light on the driver's eyes blocks the driver's view or causes eye strain. Further, retro-reflection of light from the driver's eyes causes efficiency deterioration. That is, light entering from the front interferes with light reflected from the driver's eyes, making it difficult to accurately check the condition of the driver's eyes, and as a result, the driver should keep his/her eyes on the front light emitting unit while driving, threatening safe driving. Thus, there is a need in the art for a solution to the above-mentioned limitations.

PRIOR ART DOCUMENTS

Patent Documents

Korean Patent Publication No. 10-2006-0126352 (published on Dec. 7, 2006)

SUMMARY OF THE INVENTION

The present invention has been made in an effort to solve the above problems, and it is an object of the present invention to provide an improved drowsiness prevention system for a vehicle that is installed such that infrared light is directly directed toward the driver's eyes while focusing the infrared light on the driver's eyes in order to more accurately determine whether the driver is drowsy or not, avoiding the need to mount an infrared light source, that is, a light emitting unit, in front of the driver.

A drowsiness prevention system according to one aspect of the present invention is installed in a vehicle and includes: a light emitting unit irradiating infrared light, whose distribution angle pattern is inclined from a central axial line, toward the driver's iris; an infrared camera capturing images of the driver's iris; and a warning sound generating unit determining the driver to be drowsy to generate a warning sound when the driver's iris is not detected from the images captured by the infrared camera within a preset reference time, wherein the light emitting unit is mounted in an area other than the driver's front area.

According to one embodiment, the light emitting unit is mounted in one of the area of the windscreen other than the area of the windscreen facing the driver's seat back, the rear-view mirror, the instrument cluster, the dashboard, the sun visor, the center fascia, and the air conditioner grill of the vehicle.

According to one embodiment, the light emitting unit includes a base including a chip mounting surface, an LED chip including a central axial line perpendicular to the chip mounting surface, a TIR lens having a refractive index higher than that of a medium covering the upper and side surfaces of the LED chip and including entrance planes bordering the medium and exit planes from which light entering through the entrance planes is emitted, and a reflector coupled to the TIR lens.

According to one embodiment, the entrance planes include main entrance planes having one or more radii of curvature and protruding toward the LED chip and a pair of lateral entrance planes connected to the main entrance planes at the edges of the main entrance planes and extending downward from the main entrance planes; the exit planes include a main exit plane located above the main entrance planes and a pair of lateral exit planes connected to the main exit plane at the edges of the main exit plane, extending downward from the main exit plane, and connected to the pair of lateral entrance planes; and two points on the main entrance planes at the same height from the LED chip are not equidistant from the central axial line such that the amount of light passing through the main entrance planes is localized to one side of the central axial line.

According to one embodiment, the main entrance planes include a first main entrance plane and a second main entrance plane divided from each other by the central axial line and the second main entrance plane is more downwardly biased than the first main entrance plane.

According to one embodiment, the first main entrance plane has the same center of curvature and the same radius of curvature as the second main entrance plane.

According to one embodiment, the pair of lateral exit planes have different heights and the main exit plane is inclined from the horizontal.

According to one embodiment, the pair of lateral exit planes include a first lateral exit plane and a second lateral exit plane whose upper end is lower than that of the first lateral exit plane; and the main exit plane is inclined downward from the first lateral exit plane to the second lateral exit plane.

According to one embodiment, the reflector is designed such that the amount of infrared light reflected toward the main exit plane through the first lateral exit plane is larger than that of infrared light reflected toward the main exit plane through the second lateral exit plane.

According to one embodiment, the main entrance planes include a first main entrance plane and a second main entrance plane divided from each other by the central axial line and have different centers of curvature; and the radius of curvature of the first main entrance plane is larger than that of the second main entrance plane.

According to one embodiment, the pair of lateral exit planes are at different angles to the central axial line.

The light emitting unit of the improved drowsiness prevention system according to the present invention is not mounted in front of the driver and directly irradiates light onto the driver's eyes, eliminating the need for the driver to continuously watch the light emitting unit.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Preferred embodiments of the present invention will now be described with reference to the accompanying drawings. It should be noted that the drawings and embodiments are simplified and illustrated such that those skilled in the art can readily understand the present invention.

Figure 1:
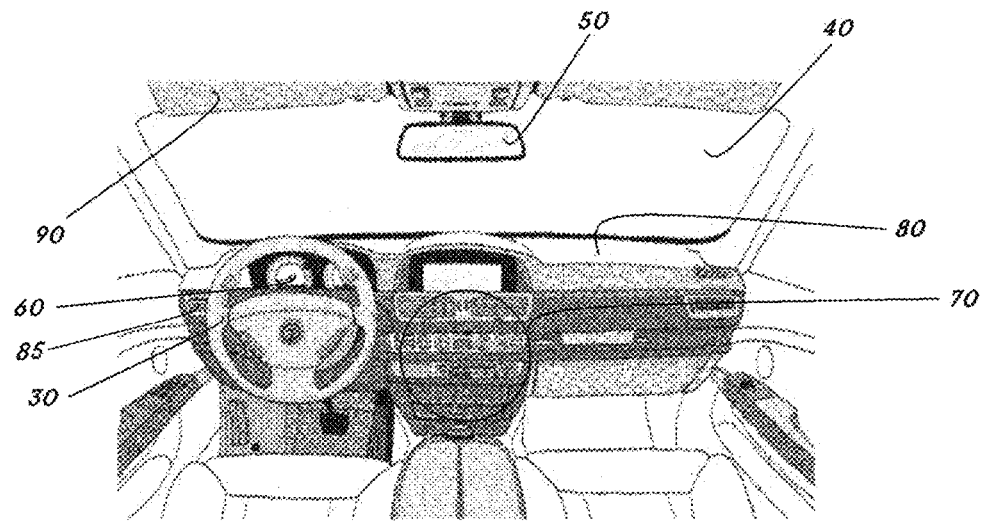
FIG. 1 illustrates internal structures of a vehicle in which a light emitting unit of a drowsiness prevention system for a vehicle according to one embodiment of the present invention can be mounted.

FIG. 1 illustrates internal structures of a vehicle. As illustrated in FIG. 1, the vehicle includes a steering wheel 30, a windscreen 40, a rear-view mirror 50, an instrument cluster 60, a center fascia 70, a dash board 80, an air conditioner grill 85, and a sun visor 90. Particularly, a light emitting unit of a drowsiness prevention system for a vehicle according to the present invention may be mounted in one of the inner structures.

Figure 2:
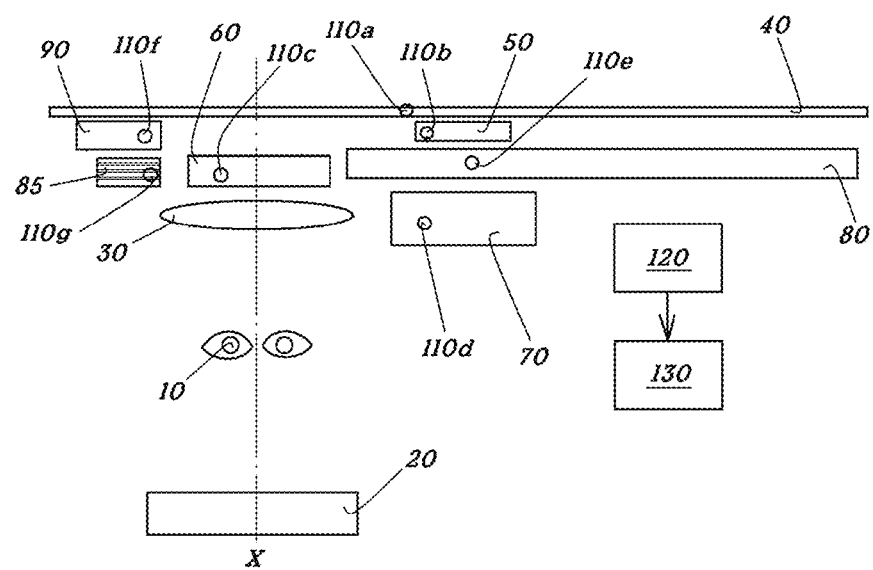
FIG. 2 is a block diagram illustrating a drowsiness prevention system for a vehicle according to one embodiment of the present invention.

Referring to FIG. 2, a drowsiness prevention system of the present invention includes a light emitting unit 110 (110a, 110b, 110c, 110d, 110e, 110f and/or 110g), an infrared camera 120, and a warning sound generating unit 130.

The light emitting unit 110 is an element that irradiates infrared (IR) light onto the driver's iris 10. As illustrated in this figure, the light emitting unit 110 may be mounted in the windscreen 40 (110a), the rear-view mirror 50 (110b), the instrument cluster 60 (110c), the center fascia 70 (100d), the dash board 80 (100e), the sun visor 90 (100f) or the air conditioner grill 85 (110g). The center fascia is a control panel board provided at the center between the driver's and passenger's seats. As mentioned above, when the light emitting unit 110 is mounted in an area other than the driver's front area, a sufficient field of view can be secured for the driver, the driver's eyes can be relieved from eye strain or the efficiency of the light emitting unit can be prevented from deterioration resulting from retro-reflection from the driver's eyes. The distribution angle pattern of infrared light from the light emitting unit 110 is inclined from a central axial line passing through the center of the light emitting unit 110. The light emitting unit 110 irradiates infrared light whose distribution angle pattern is inclined from the central axial line onto the driver's iris. A detailed description will be given regarding the central axial line and the distribution angle pattern of infrared light from the light emitting unit 110 with reference to FIGS. 5 to 14.

The infrared camera 120 is an element that captures images of the driver's iris 10. As illustrated, the infrared camera 120 may be separated from or integrated with the light emitting unit 110.

The warning sound generating unit 130 is an element that analyzes the images of the driver's iris 10 captured by the infrared camera 120 and determines the driver to be drowsy to generate a warning sound when the driver's iris is not detected from the images within a preset reference time. When the driver's iris is not detected for a short time, for example, approximately 3 seconds (that is, when the driver keeps his/her eyes closed), the warning sound generating unit 130 determines the driver to be drowsy and generates a warning sound. The infrared camera 120 may be connected to the warning sound generating unit 130 through a wire cable or wireless communication. For wireless communication, a frequency band equal to or higher than the VHF band may be used for high sensitivity.

Figure 3:
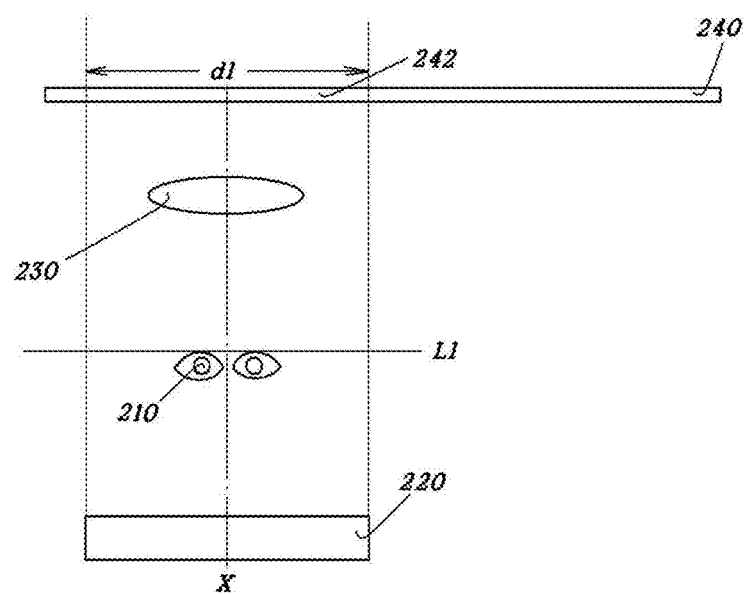
FIGS. 3 and 4 are views explaining the driver's front side.
Figure 4:
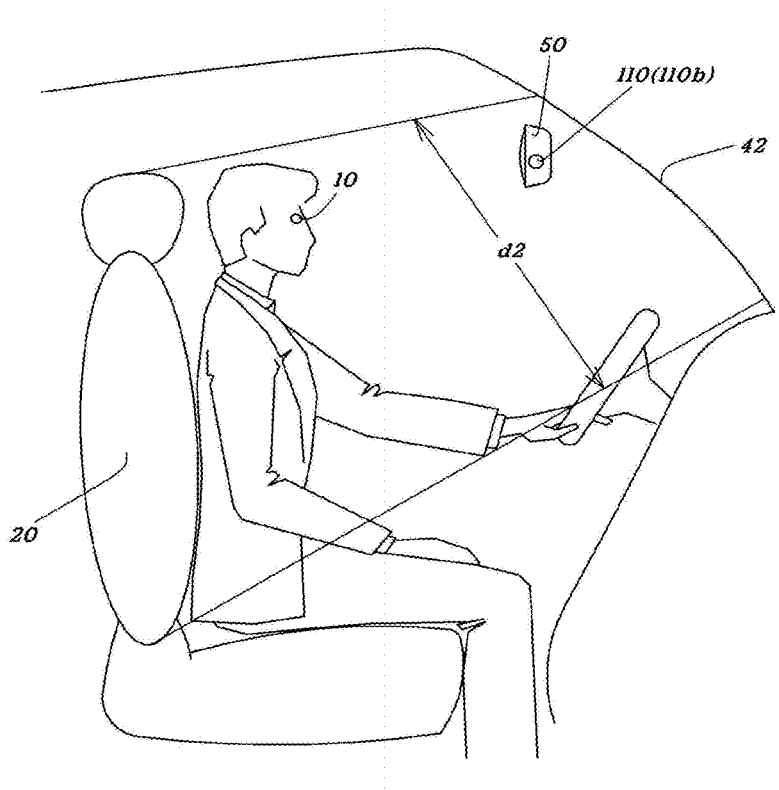

With reference to FIGS. 3 and 4, the driver's front area will be described in detail. The driver's front area includes an area 42 of the windscreen 40 facing the driver's seat back 20 and a space between the area 42 of the windscreen 40 and the driver's seat back 20. As illustrated in FIGS. 3 and 4, when imaginary lines are drawn from the driver's seat back 20 to the windscreen 40, the area 42 has a width d1 corresponding to the width of the driver's seat back 20. In addition, when imaginary lines are drawn from the driver's seat back 20 to the windscreen 40 taking into consideration the height of the driver's seat back 20, the area 42 of the windscreen 40 has a height d2 substantially corresponding to the distance from the lowest to the highest end of the windscreen 40. It should be ensured while driving that the light emitting unit 110 is not located in the driver's front area, which includes the area 42 of the windscreen 40 and the space defined by the area 42 of the windscreen 40 and the driver's seat back 20. The line X in FIG. 3 (the same as the line X in FIG. 2) is connected from the center of the driver's seat back 20 to the windscreen 40 through the steering wheel 30 and passes through the center of the driver's front area defined above.

As used herein, the term "area other than the driver's front area" refers to an area located in front of an imaginary line L1 passing through the locations of the driver's eyes 210 other than the driver's front area. For example, the area other than the driver's front area is the area 42 of the windscreen 40 or an area where the rear-view mirror 50, the instrument cluster 60, the center fascia 70, the dash board 80 or the sun visor 90 is located.

As described previously, the distribution angle pattern of infrared light irradiated from the light emitting unit 110 is inclined from the central axial line. This inclination enables accurate irradiation onto the driver's iris although the light emitting unit 110 is not located in front of the driver.

An alarm goes off only when the iris is not recognized within a preset time, as described above. Alternatively, it may be determined whether the driver is drowsy or not by previously capturing an image of the driver's normal eyes with the infrared camera 120, storing the image in a memory, and comparing the stored image with real-time images captured with the infrared camera or analyzing the opening/closing of the driver's eyes. Specifically, the drowsiness of the driver can be determined by the number of times of iris detection in a predetermined time, the frequency of iris detection, the time interval of iris detection or a combination thereof.

Only an audible alarm has been mentioned as the warning sound generated by the warning sound generating unit 130 but the driver may be informed in a visual or tactile form.

Next, FIGS. 5 to 8 illustrate an exemplary light emitting unit 110 irradiating infrared light onto driver's eyes in a drowsiness prevention system for a vehicle according to one embodiment of the present invention. The light emitting unit 110 includes a base 20, an LED chip 40, a TIR lens 60, and a reflector 80.

The base 20 may be, for example, a lead frame, a substrate or a package body including lead terminals. The base 20 includes a chip mounting surface 22 parallel to its flat bottom surface. The chip mounting surface 22 is preferably a flat inner bottom of a recess 24 depressed from the upper surface of the base 20. The LED chip 40 includes a light emitting surface and an imaginary central axial line Z perpendicular to the chip mounting surface 22 of the base 20. The base 20 includes upper electrode pads disposed on the upper surface thereof and electrically connected to electrodes of the LED chip 40 by flip-chip or wire bonding and lower electrode pads bonded to an external substrate on the bottom surface thereof.

The TIR lens 60 is integrally coupled to the reflector 80. The TIR lens 60 includes entrance planes 61, 62, 63, and 64 on which infrared light emitted from the LED chip 40 is incident and exit planes 65, 66, and 67 from which infrared light entering through the entrance planes 61, 62, 63, and 64 is emitted. When the TIR lens 60 and the reflector 80 integrated with the TIR lens 60 are coupled to the upper surface of the base 20, a space filled with a medium (preferably air) having a lower refractive index than that of the TIR lens 60 is formed between the TIR lens 60 and the base 20. Since the LED chip 40 is mounted on the chip mounting surface 22 of the base 20 in the medium-filled space, the upper and side surfaces of the LED chip 40 are covered with the medium. The entrance planes 61, 62, 63, and 64 of the TIR lens 60 border the medium. Light entering the TIR lens 60 through the entrance planes 61, 62, 63, and 64 exits through the exit planes 65, 66, and 67.

The reflector 80 has an asymmetric structure relative to the central axial line Z and is integrated with the TIR lens 60 in a cavity thereof. The cavity of the reflector 80 includes a lower hole into which the TIR lens 60 is fitted, an upper hole through which light is finally allowed to pass, and a lateral reflection plane connecting the lower hole to the upper hole.

Figure 7:
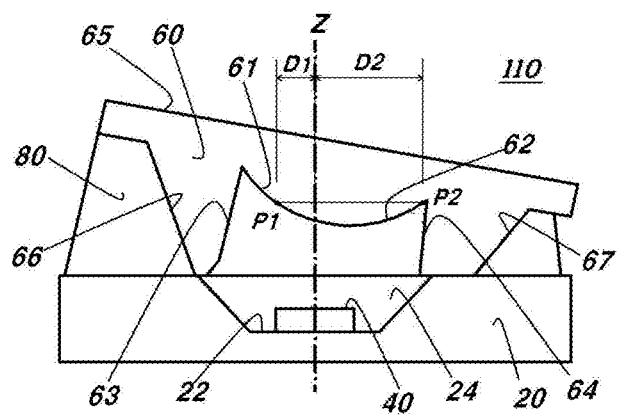
FIG. 7 is a cross-sectional view taken along line A-A of FIG. 6.
Figure 8:
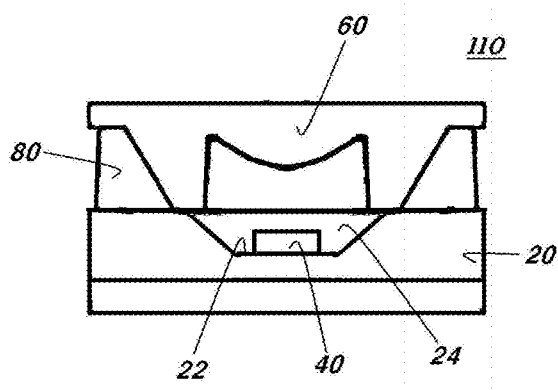
FIG. 8 is a cross-sectional view taken along line B-B of FIG. 6.

FIG. 7 illustrates cross sections of the TIR lens 60 and the reflector 80. The main entrance planes 61 and 62 have a single radius of curvature and protrude toward the LED chip 40. The pair of lateral entrance planes 63 and 64 are connected to the main entrance planes 61 and 62 at the edges of the main entrance planes 61 and 62 and extend downward from the main entrance planes 61 and 62 while bordering the reflection plane of the reflector 80. The main exit plane 65 is located above the main entrance planes 61 and 62. The pair of lateral exit planes 66 and 67 are connected to the main exit plane 65 at the edges of the main exit plane 65, extend downward from the main exit plane 65, and are connected to the pair of lateral entrance planes 63 and 64.

Here, when the amount of infrared light passing through the main entrance planes 61 and 62 is localized to one side (the right side) of the central axial line Z, the distribution angle pattern of the infrared light may be inclined to the one side. As illustrated in FIG. 7, the light emitting unit 110 is designed such that the amount of infrared light passing through the main entrance planes 61 and 62 is localized to one side (the right side) of the central axial line Z. According to this design, two points P1 and P2 on the main entrance planes at the same height from the LED chip 40 are not equidistant from the central axial line Z.

In contrast, in the case where two points on a symmetric main entrance plane at the same height from the LED chip 40 are equidistant from the central axial line, the intensity of light is the highest at the center of the main entrance plane, making it impossible to obtain a one-side inclined distribution angle pattern of light.

Referring again to FIG. 7, the first main entrance plane 61 and the second main entrance plane 62 are divided from each other by the central axial line Z. Since the main entrance planes 61 and 62 have a single radius of curvature, they have the same center of curvature and the same radius of curvature. Nevertheless, the first main entrance plane 61 ascends and the second main entrance plane 62 descends from a point passing through the central axial line Z. Due to this shape, the second main entrance plane 62 is more downwardly biased than the first main entrance plane 61.

The upper ends of the pair of lateral exit planes 66 and 67 connected to the main exit plane 65 at the edges of the main exit plane 65 have different heights. Thus, the main exit plane 65 is inclined from the horizontal. More specifically, the upper end of the second lateral exit plane 67 is lower than that of the first lateral exit plane 66 such that the main exit plane 65 is inclined downward from the upper end of the first lateral exit plane 66 to the upper end of the second lateral exit plane 67 to connect the upper ends of the two lateral exit planes 66 and 67. Light from the LED package 40 is finally emitted through the main exit plane 65. The main exit plane 65 is preferably inclined at the same slope as the slope of the tangent at the point of intersection between the main entrance planes 61 and 62 and the central axial line Z.

The reflector 80 is designed such that the amount of light reflected toward the main exit plane 65 through the first lateral exit plane 66 is larger than the amount of light reflected toward the main exit plane 65 through the second lateral exit plane 67. Particularly, the reflector 80 is designed such that the reflection plane bordering the first lateral exit plane 66 is used to reflect light emitted through the first lateral exit plane 66 toward the main exit plane 65.

Here, the first lateral exit plane 66 may be inclined to one side and its inclination angle can be determined such that the amount of light directly emitted through the main exit plane 65 without being reflected from the lateral exit plane is enhanced. In other words, the first angle between the first lateral exit plane 66 and the central axial line Z is larger than the second angle between the second lateral exit plane 67 and the central axial line Z so that light can be reflected at a larger angle from the reflection plane of the reflector 80 bordering the first lateral exit plane 66 to increase the amount of light in the right side of the central axial line Z.

Although not specifically illustrated, the light emitting unit 110 has stepped portions for stoppers that adjoin the lower surface of the reflector 80 and the upper surface of the base 20 without tolerances. The stepped portions ensure assembly of the reflector 80 and the TIR lens 60 integrated with the reflector 80 in correct positions on the base 20. This allows the TIR lens 60 and the LED chip 40 to be located corresponding to each other to prevent the distribution angle pattern of light from deviating from the intended one by tolerances when assembled.

The light emitting unit 110 is not particularly limited to the above structure as long as its structure includes a base including a chip mounting surface and an LED chip whose central axial line is inclined relative to the chip mounting surface.

Figure 5:
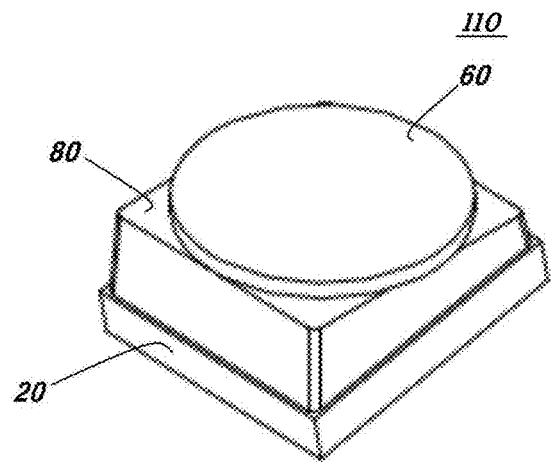
FIG. 5 is a perspective view illustrating an exemplary light emitting unit irradiating infrared light onto driver's eyes in a drowsiness prevention system for a vehicle according to one embodiment of the present invention.
Figure 6:
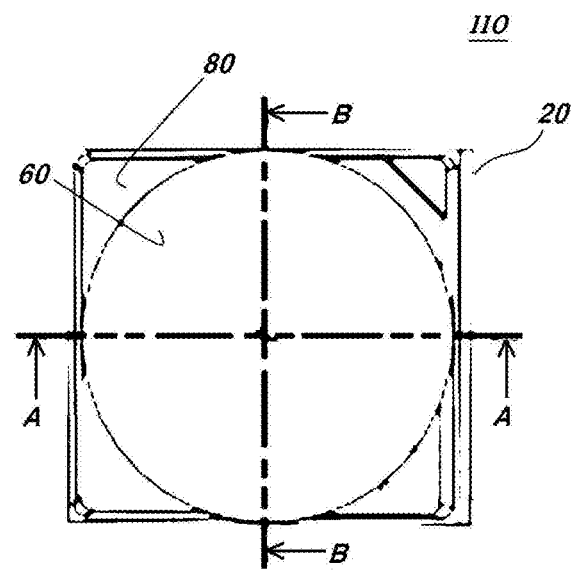
FIG. 6 is a plan view illustrating the light emitting unit of FIG. 5.
Figure 9:
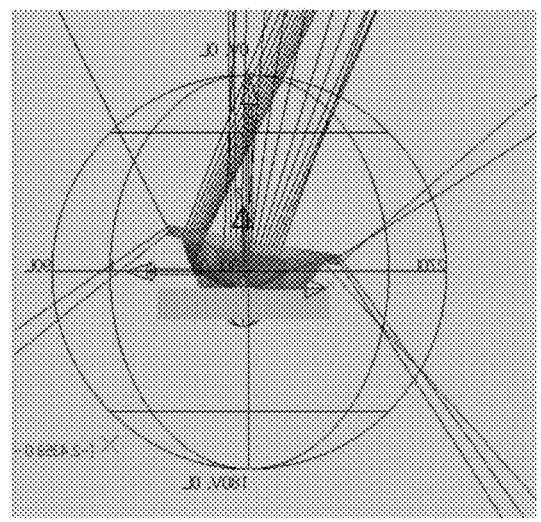
FIG. 9 is a simulation diagram illustrating the distribution angles of light from the light emitting unit of FIG. 5.

FIG. 9 is a simulation diagram illustrating the distribution angles of light from the light emitting unit 110 of FIG. 5. As can be seen from FIG. 9, the majority of infrared light emitted from the LED chip 40 is directly emitted outward from the light emitting unit 110 through the main entrance planes 61 and 62 and the main exit plane 65. Here, the emitted light is slightly localized to the right side of the central axial line Z. Light emitted from the LED chip 40 is reflected from the reflection plane bordering the first lateral exit plane 66 located at the left side of the central axial line Z and is directed toward the main exit plane 65 at the right side of the central axial line Z. The first lateral exit plane 66 and the reflection plane of the reflector 80 bordering the first lateral exit plane 66 can increase the amount of light within predetermined angles to the central axial line Z and can enhance the uniformity of light emission in the intended direction.

Figure 10:
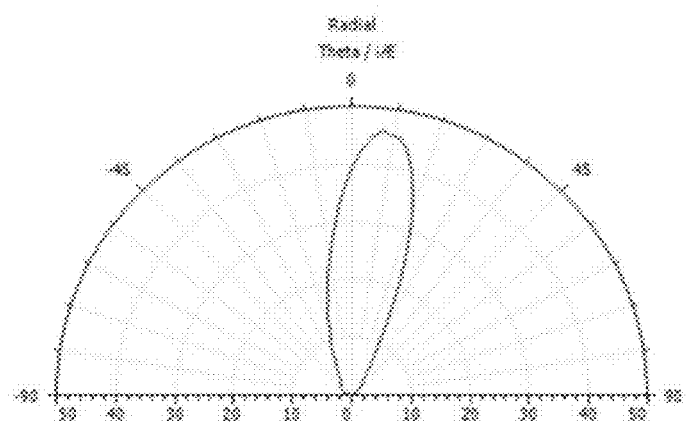
FIG. 10 illustrates the distribution angle pattern of light from the light emitting unit of FIG. 5.

FIG. 10 illustrates the distribution angle pattern of light from the light emitting unit 110 of FIG. 5. Referring to FIG. 10, the light emitting unit 110 shows distribution angles of light slightly inclined from the central axial line. In contrast, a conventional normal light emitting unit having a structure in which a TIR lens and a reflector are symmetric to each other with respect to a central axial line of an LED chip forms a distribution angle pattern of light around the central axial line of the LED chip (i.e. around 0°). Therefore, the light emitting unit 110 can be mounted at various locations other than in front of the driver in the vehicle and can irradiate infrared light onto the driver's iris to accurately recognize and analyze whether the driver is drowsy or not, with the result that the driver can be relieved from eye strain and the restriction on the location of the light emitting unit can be removed.

Next, FIGS. 11 to 14 illustrates another exemplary light emitting unit 110 of a drowsiness prevention system for a vehicle according to one embodiment of the present invention. The light emitting unit 110 includes a base 20, an LED chip 40, a TIR lens 60, and a reflector 80, as in the previous embodiment.

The TIR lens 60 is integrally coupled to the reflector 80. The TIR lens 60 includes entrance planes 61, 62, 63, and 64 on which infrared light emitted from the LED chip 40 is incident and exit planes 65, 66, and 67 from which infrared light entering through the entrance planes 61, 62, 63, and 64 is emitted. A space filled with air as a medium having a lower refractive index than that of the TIR lens 60 is formed between the TIR lens 60 and the base 20. Since the LED chip 40 is mounted on the chip mounting surface 22 of the base 20 in the medium-filled space, the upper and side surfaces of the LED chip 40 are covered with the medium. The entrance planes of the TIR lens 60 border the medium. Light entering the TIR lens 60 through the entrance planes exits through the exit planes.

The reflector 80 has an asymmetric structure relative to a central axial line Z and is integrated with the TIR lens 60 in a cavity thereof.

Figure 13:
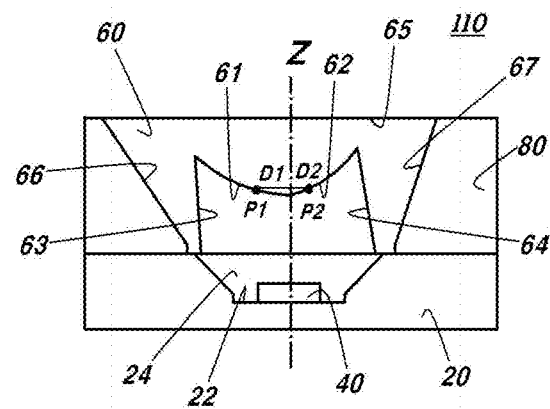
FIG. 13 is a cross-sectional view taken along line C-C of FIG. 12.
Figure 14:
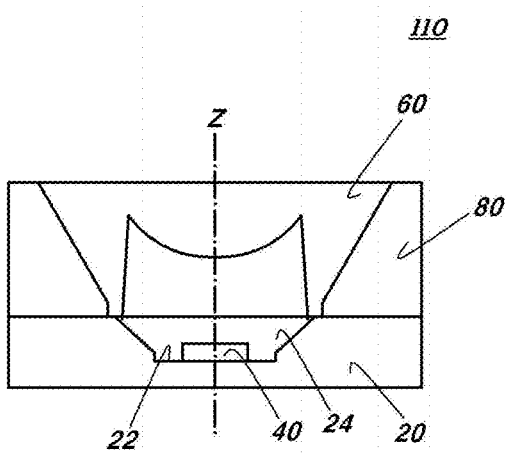
FIG. 14 is a cross-sectional view taken along line D-D of FIG. 12.

FIG. 13 illustrates cross sections of the TIR lens 60 and the reflector 80. The main entrance planes 61 and 62 of the TIR lens 60 have different centers of curvature and different radii of curvature and protrude toward the LED chip 40. The pair of lateral entrance planes 63 and 64 are connected to the main entrance planes 61 and 62 at the edges of the main entrance planes 61 and 62 and extend downward from the main entrance planes 61 and 62. The main exit plane 65 is located above the main entrance planes 61 and 62. The pair of lateral exit planes 66 and 67 are connected to the main exit plane 65 at the edges of the main exit plane 65, extend downward from the main exit plane 65, and are connected to the pair of lateral entrance planes 63 and 64.

Here, when the amount of infrared light passing through the main entrance planes 61 and 62 is localized to one side (the right side) of the central axial line Z, the distribution angle pattern of the infrared light may be inclined to the one side. The light emitting unit 110 is designed such that the amount of infrared light passing through the main entrance planes 61 and 62 is localized to one side (the right side) of the central axial line Z. For this design, the first and second main entrance planes 61 and 62 having different centers of curvature are divided from each other by the central axial line Z, as illustrated in FIG. 13. The radius of curvature of the first main entrance plane 61 is larger than that of the second main entrance plane 62. Thus, two points P1 and P2 on the main entrance planes at the same height from the LED chip 40 are spaced different distances D1 and D2 from the central axial line Z.

The upper ends of the pair of lateral exit planes (i.e. the first lateral exit plane 66 and the second lateral exit plane 67) connected to the main exit plane 65 at the edges of the main exit plane 65 have different heights. Thus, the main exit plane 65 is inclined from the horizontal.

The reflector 80 is designed such that the amount of light reflected toward the main exit plane 65 through the first lateral exit plane 66 is larger than the amount of light reflected toward the main exit plane 65 through the second lateral exit plane 67. Particularly, the reflector 80 is designed such that the reflection plane bordering the first lateral exit plane 66 is used to reflect light emitted through the first lateral exit plane 66 toward the main exit plane 65. Here, the first lateral exit plane 66 may be inclined to one side and its inclination angle can be determined such that the amount of light directly emitted through the main exit plane 65 without being reflected from the lateral exit plane is enhanced. In other words, the first angle between the first lateral exit plane 66 and the central axial line Z is larger than the second angle between the second lateral exit plane 67 and the central axial line Z so that light can be reflected at a larger angle from the reflection plane of the reflector 80 bordering the first lateral exit plane 66 to increase the amount of light in the right side of the central axial line Z.

Figure 11:
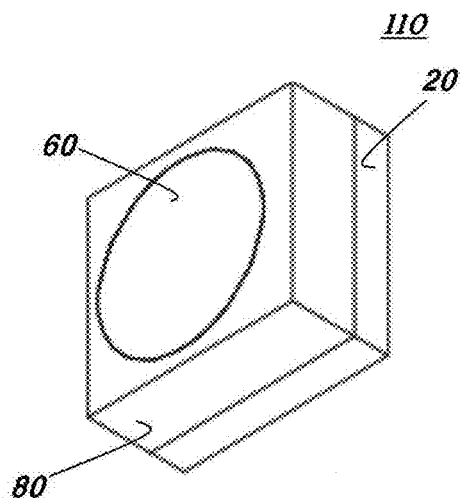
FIG. 11 is a perspective view illustrating another exemplary light emitting unit irradiating infrared light onto driver's eyes in a drowsiness prevention system for a vehicle according to one embodiment of the present invention.
Figure 12:
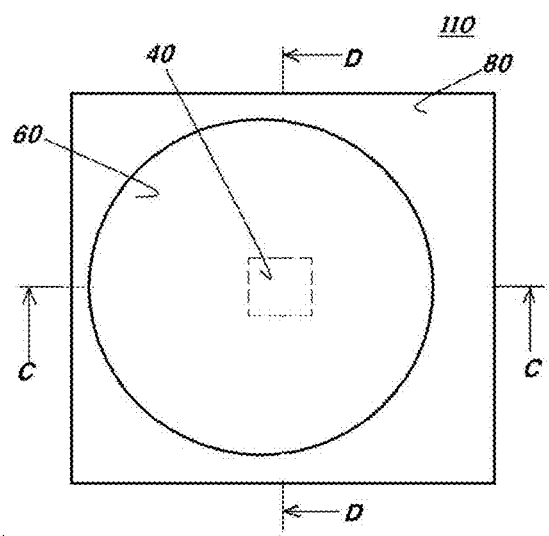
FIG. 12 is a plan view illustrating the light emitting unit of FIG. 11.
Figure 15:
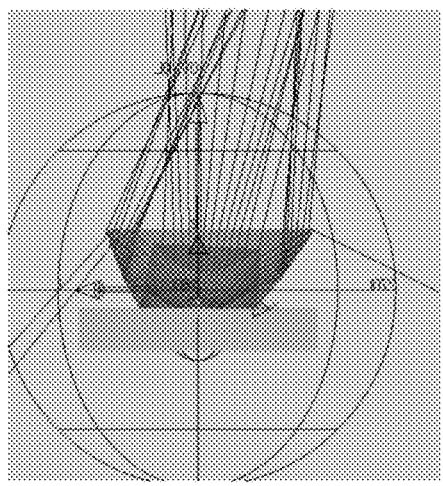
FIG. 15 is a simulation diagram illustrating the distribution angles of light from the light emitting unit of FIG. 11.

FIG. 15 is a simulation diagram illustrating the distribution angles of light from the light emitting unit 110 of FIG. 11. As can be seen from FIG. 15, the majority of infrared light emitted from the LED chip 40 is directly emitted outward from the light emitting unit 110 through the main entrance planes 61 and 62 and the main exit plane 65. Here, the emitted light is localized to the right side of the central axial line Z.

In the previous embodiment, the amount of light emitted from the light emitting unit along the central axial line is reduced. In contrast, in this embodiment, the amount of light emitted from the light emitting unit along the central axial line is not reduced. Specifically, light emitted in the left direction from the LED chip is reflected from the reflection plane with a large inclination angle bordering the first lateral exit plane and propagates in the right direction relative to the central axial line. Light emitted in the right direction from the LED chip is reflected from the reflection plane with a small inclination angle bordering the second lateral exit plane and propagates in the vertical direction in the right region.

Figure 16:
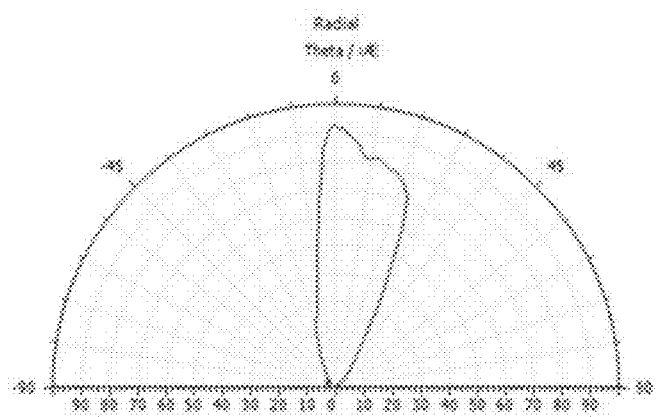
FIG. 16 illustrates the distribution angle pattern of light from the light emitting unit of FIG. 11.

FIG. 16 illustrates the distribution angle pattern of light from the light emitting unit 110 of FIG. 11. Referring to FIG. 16, the light emitting unit 110 shows distribution angles of light inclined from the central axial line. In contrast, a conventional light emitting unit having a structure in which a TIR lens and a reflector are symmetric to each other with respect to a central axial line of an LED chip forms a distribution angle pattern of light around the central axial line of the LED chip (i.e. around 0°). Therefore, the light emitting unit 110 can be mounted at various locations other than in front of the driver in the vehicle and can irradiate infrared light onto the driver's iris to accurately recognize and analyze whether the driver is drowsy or not, with the result that the driver can be relieved from eye strain and the restriction on the location of the light emitting unit can be removed.

The drowsiness prevention system of the present invention can prevent a driver from driving while drowsy, contributing to the prevention of traffic accidents from driving while drowsy. Particularly, the drowsiness prevention system of the present invention can be used in various applications. For example, the drowsiness prevention system of the present invention is applicable to public transportation, such as a bus or taxi, to inform a passenger of the driver's condition.

What is claimed is:

1. A drowsiness prevention system installed in a vehicle and comprising:
   a light emitting unit irradiating infrared light, whose distribution angle pattern is inclined from a central axial line, toward the driver's iris;
   an infrared camera capturing images of the driver's iris; and
   a warning sound generating unit determining the driver to be drowsy to generate a warning sound when the driver's iris is not detected from the images captured by the infrared camera within a preset reference time, wherein the light emitting unit is mounted in an area other than the driver's front area, and
   wherein the light emitting unit comprises:
      a base comprising a chip mounting surface;
      a light emitting diode (LED) chip comprising a central axial line perpendicular to the chip mounting surface;
      a total internal reflection (TIR) lens comprising entrance planes and exit planes from which light entering through the entrance planes is emitted; and
      a reflector coupled to the TIR lens.

2. The drowsiness prevention system according to claim 1, wherein the light emitting unit is mounted in one of the area of a windscreen other than the area of a windscreen facing a driver's seat back, a rear-view mirror, an instrument cluster, a dashboard, a sun visor, a center fascia, and an air conditioner grill of the vehicle.

3. The drowsiness prevention system according to claim 1, wherein the entrance planes comprise main entrance planes having one or more radii of curvature and protruding toward the LED chip and a pair of lateral entrance planes connected to the main entrance planes at the edges of the main entrance planes and extending downward from the main entrance planes; the exit planes comprise a main exit plane located above the main entrance planes and a pair of lateral exit planes connected to the main exit plane at the edges of the main exit plane, extending downward from the main exit plane, and connected to the pair of lateral entrance planes; and two points on the main entrance planes at the same height from the LED chip are not equidistant from the central axial line such that the amount of light passing through the main entrance planes is localized to one side of the central axial line.

4. The drowsiness prevention system according to claim 3, wherein the main entrance planes comprise a first main entrance plane and a second main entrance plane divided from each other by the central axial line and the second main entrance plane is more downwardly biased than the first main entrance plane.

5. The drowsiness prevention system according to claim 4, wherein the first main entrance plane has the same center of curvature and the same radius of curvature as the second main entrance plane.

6. The drowsiness prevention system according to claim 3, wherein the pair of lateral exit planes have different heights and the main exit plane is inclined from the horizontal.

7. The drowsiness prevention system according to claim 5, wherein the pair of lateral exit planes comprise a first lateral exit plane and a second lateral exit plane whose upper end is lower than that of the first lateral exit plane; and the main exit plane is inclined downward from the first lateral exit plane to the second lateral exit plane.

8. The drowsiness prevention system according to claim 7, wherein the reflector is designed such that the amount of infrared light reflected toward the main exit plane through the first lateral exit plane is larger than that of infrared light reflected toward the main exit plane through the second lateral exit plane.

9. The drowsiness prevention system according to claim 3, wherein the main entrance planes comprise a first main entrance plane and a second main entrance plane divided from each other by the central axial line and have different centers of curvature; and the radius of curvature of the first main entrance plane is larger than that of the second main entrance plane.

10. The drowsiness prevention system according to claim 3, wherein the pair of lateral exit planes are at different angles to the central axial line.

\* \* \* \* \*